United States Patent [19]
Perry

[11] 3,742,896
[45] July 3, 1973

[54] MOUNTING DEVICE FOR LOW PRESSURE TIRE INDICATING MECHANISMS

[76] Inventor: Mark J. Perry, Box 187, Star Route, Fort George, Fla. 32226

[22] Filed: Apr. 13, 1971

[21] Appl. No.: 133,623

[52] U.S. Cl............... 116/34 R, 73/146.2, 248/205
[51] Int. Cl............................................. B60c 23/04
[58] Field of Search...................... 116/34 R, 34 A; 73/146.3, 146.8, 146.2; 248/230, 226, 274, 226 A; 287/52.08

[56] References Cited
UNITED STATES PATENTS

| | | | |
|---|---|---|---|
| 1,465,837 | 8/1923 | Barry | 116/34 A |
| 1,949,678 | 3/1934 | Doran | 287/52.08 |
| 3,208,425 | 9/1965 | Jousma et al. | 116/34 R |
| 3,232,573 | 2/1966 | Berman | 248/226 A |
| 3,260,233 | 7/1966 | Bergunder | 116/34 R |
| 3,476,349 | 11/1969 | Smith | 287/52.08 X |
| 3,527,189 | 9/1970 | Perry | 116/34 R |

Primary Examiner—Louis J. Capozi
Attorney—George H. Baldwin and Arthur G. Yeager

[57] ABSTRACT

A mounting device to attach the mechanism to a vehicle axle hub including a ring member telescoped around the hub and spaced set screws to releasably connect the member to the hub. An element is spaced outwardly of the member which extends into a passageway in the mechanism base and means are provided to releasably maintain the element in the passageway.

10 Claims, 4 Drawing Figures

PATENTED JUL 3 1973 3,742,896

INVENTOR
Mark J. Perry
BY
George H. Baldwin
ATTORNEY

MOUNTING DEVICE FOR LOW PRESSURE TIRE INDICATING MECHANISMS

BACKGROUND OF THE INVENTION

1. Field of the Invention

This invention relates to a mounting device specifically for attaching low pressure tire indicating mechanisms to vehicle hubs, particularly on tractors and trailers having dual pneumatic tire assemblies.

2. Description of the Prior Art

There have been numerous tire alarms and mounting arrangements for such alarms, as set forth in applicant's U.S. Pat. No. 3,527,189, issued on Sept. 8, 1970 and entitled Low Pressure Tire Indicating Mechanism and the prior art set forth and the references cited therein. Many of the above patents have various deficiencies which are substantially alleviated in accord with the invention hereinafter described.

SUMMARY OF THE INVENTION

The invention relates to a device for mounting a low pressure tire indicating mechanism to an axle hub of a vehicle and includes a ring member adapted to telescope around an axle hub, means for attaching the member to a hub and releasable means attached to the member and adapted to engage a base portion of a low pressure tire indicating mechanism, the releasable means releasably connecting a low pressure tire indicating mechanism to the member.

Other aspects of the invention include a plurality of spaced set screws threadedly attached to the member and extending generally radially of the hub for releasably engaging same and constituting the aforesaid means for attaching. The releasable means includes an element spaced outwardly of the member and adapted to be inserted into a passageway in a base portion of a low pressure tire indicating mechanism. Means are provided for releasably maintaining the element in the base portion passageway. The releasable means also includes another element spaced outwardly of the ring member and spaced away from the first element which is inserted into a passageway in a base portion of another low pressure tire indicating mechanism so that two mechanisms may be attached by the device to the hub.

A general object of this invention is to provide an improved mounting device for low pressure tire indicating mechanisms and the combination therewith.

A particular object is the provision of an improved releasably connected mounting device for an axle hub which may be mounted on various hub sizes.

Another particular object is to provide an improved mounting device which releasably attaches a low pressure indicating mechanism to a hub.

A specific object is the provision of a releasably attached low pressure indicating mechanism to a hub through an improved mounting device in which the mechanism may be readily removed when desired and replaced, if necessary.

Other objects are to provide an improved mounting device and combination with low pressure tire indicating mechanisms that are durable in construction and use, readily and inexpensively manufactured and installed on and removed from vehicles, and efficient and reliable in operation.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

DESCRIPTION OF THE PREFERRED EMBODIMENT

Figure 1:
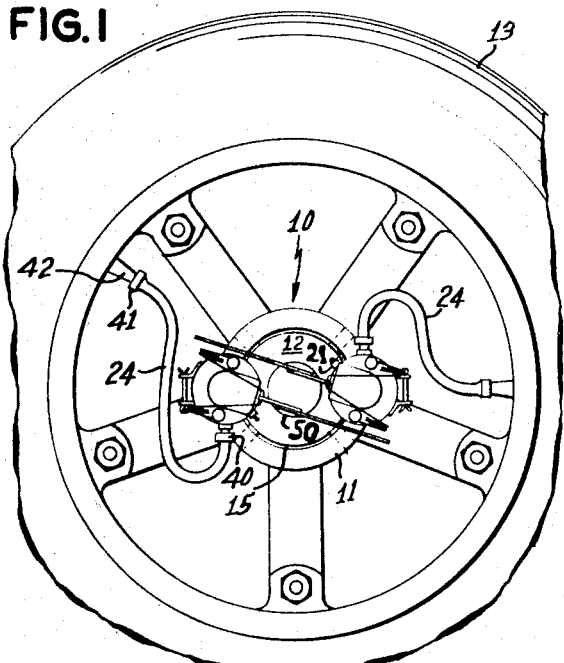
FIG. 1 is a side elevational view of the mounting device attaching a pair of low pressure indicating mechanisms to a vehicle axle hub.
Figure 2:
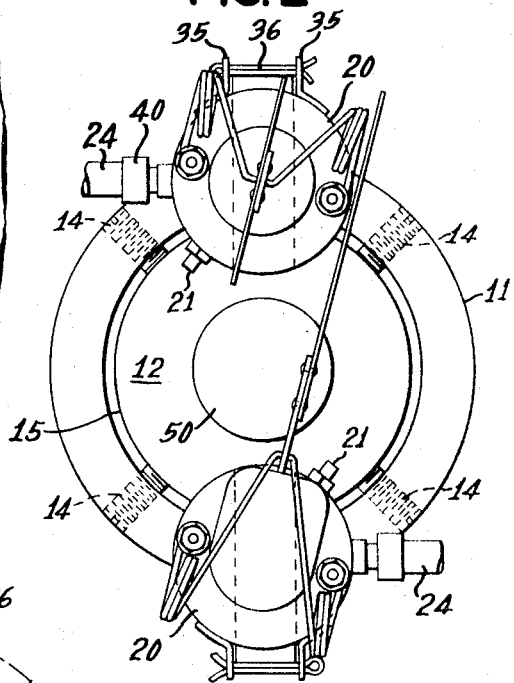
FIG. 2 is an enlarged view similar to FIG. 1 with the wheel and tire assembly removed for clarity.

Referring now more particularly to the drawing, the mounting device is depicted generally at 10 and includes a ring member 11 telescopingly fitted around axle hub 12 of a dual vehicle pneumatic tire assembly 13, and means for releasably attaching member 11 to hub 12 is provided by a plurality of spaced set screws 14 which are threadedly attached to member 11 and extend generally radially of and into frictional engagement with hub outer surface 15.

Each of the low pressure tire indicating mechanisms 20 have been described specifically in applicant's U.S. Pat. No. 3,527,189, particularly noting the fifth embodiment in FIGS. 20 – 24, and a further description thereof is unnecessary. However, the air inlet valve 21 for each mechanism 20 is shown extending through the side wall portion 22 of the housing 23 and pneumatically communicates with the chamber (224 in U.S. Pat. No. 3,527,189) below the diaphragm (222 in U.S. Pat. No. 3,527,189) so that air may be supplied through the respective hoses 24 to the respective tires without removal of such hoses 24 or mechanisms 20.

Housing 23 includes a base portion 25, shown herein as being attached by spaced bolts 26 to housing 23, which comprises a passageway 28 extending therethrough for the reception of a complemental tongue or element 30 therein which is integral with ring member 11, as hereinafter more specifically described.

The mounting device 10 further includes releasable means attached to member 11 and adapted to engage the base portion 25 of the low pressure tire indicating mechanism 20, so that the mechanism is attached thereto, and is seen to comprise a pair of spaced elements 30 spaced laterally outwardly of the ring member 11 and respectively inserted into passageways 28 in base portions 25 of the low pressure tire indicating mechanisms 20. Each element 30 includes a portion 31 extending radially outwardly and a reentrant portion 32 extending radially inwardly with a U-shaped portion 33 between portions 31 and 32.

Figure 4:
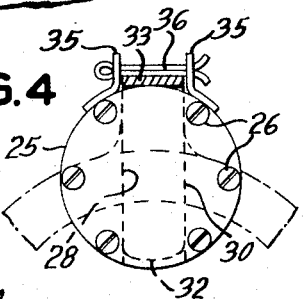
FIG. 4 is a transverse sectional view taken along line 4—4 of FIG. 3.
Figure 3:
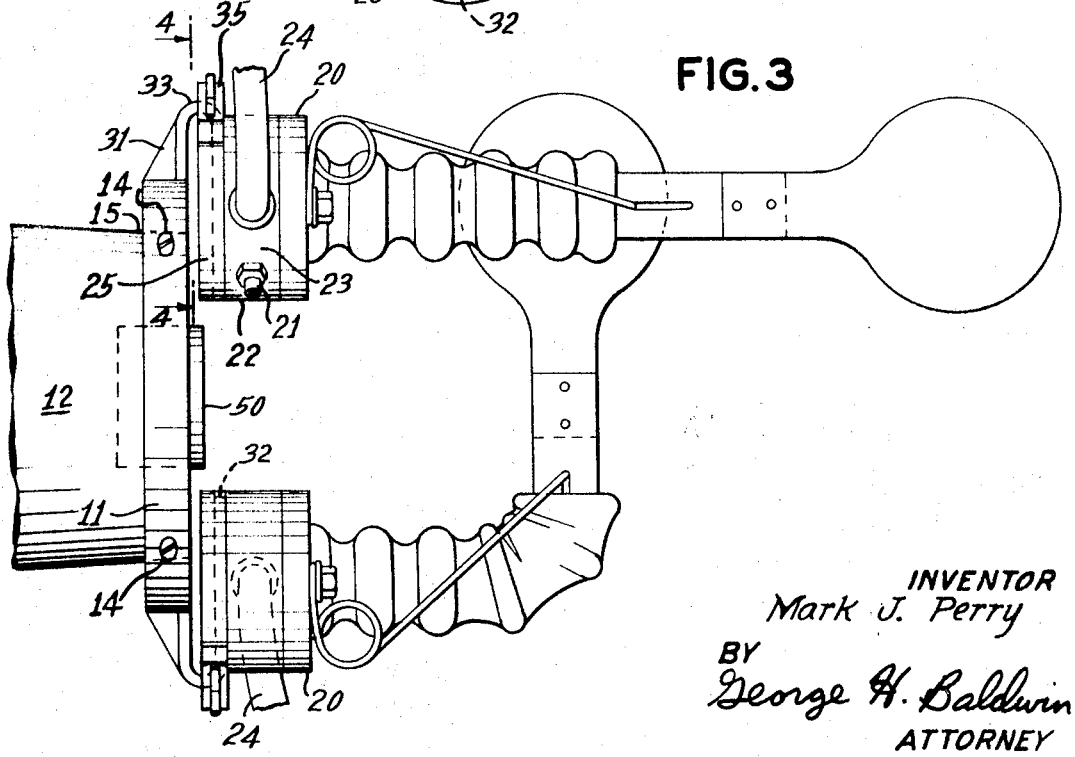
FIG. 3 is a front elevational view of FIG. 2.

The releasable means also including means for releasably maintaining element portion 32 in operative position within passageway 28 and is seen to comprise, by way of example, a pair of spaced tabs 35 integral with base portion 25 and a cotter pin 36 extending therebetween. As is evident from FIGS. 3 and 4, the U-portion 33 of element 30 is nested between tabs 35 and between cotter pin 36 and base portion 25 thereby releasably connecting mechanism 10 to ring member 11.

It is preferable that the hose 24 not include the normal relatively movable connections at its ends, i.e., connections 40 and 41 be non-rotatable with respect to hose 24, so that air leakage is inhibited. The use of such a hose is possible in the arrangement depicted because the mechanism 20 may be attached to the ring member 11 after the connection 40, hose 24 and mechanism 20 are rotated to threadedly attach connection 41 to the normal tire valve housing 42. After this is accomplished, the mechanism 20 is slidably disposed with the element 30 positioned within passageway 28 and the cotter pin 36 thereafter is inserted to releasably attach the mechanism 20 to the ring member 11. Normally, the ring member 11 is affixed to the hub 12 prior to either of the mechanisms 20 being connected thereto.

While the elements 30 are shown as extending generally radially, it is to be understood that they may be connected to ring member 11 at another angle, it being important that the axle hub grease cap 50 remain removable to permit ready checking of and addition of the grease or oil within the hub 12.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An attachment for mounting a low pressure tire indicating mechanism to an axle hub of a vehicle comprising a ring member disposable telescopingly about said axle hub, means for attaching said ring member to said axle hub, releasable means attached to said ring member and engagable with a base portion of the low pressure tire indicating mechanism, said releasable means releasably connecting the low pressure tire indicating mechanism to said ring member.

2. In the attachment as defined in claim 1 wherein said means for attaching includes a plurality of spaced set screws threadedly attached to said ring member and extending generally radially of said axle hub and releasably engageable with said axle hub.

3. In the attachment as defined in claim 1 for mounting a pair of low pressure tire indicating mechanisms to an axle hub of a vehicle wherein said releasable means includes a pair of spaced elements spaced laterally outwardly of said ring member and respectively insertable into a passageway in a base portion of each of the pair of low pressure tire indicating mechanisms.

4. In the attachment as defined in claim 1 wherein said releasable means includes an element spaced outwardly of said ring member and insertable into a passageway in a base portion of the low pressure tire indicating mechanism.

5. In the attachment as defined in claim 3 wherein said releasable means includes means for releasably maintaining said element in its operative position within said passageway.

6. In a combination comprising a low pressure tire indicating mechanism and a device for mounting said mechanism to an axle hub of a vehicle, said device including a ring member disposable telescopingly about said axle hub, means for attaching said ring member to said axle hub, releasable means attached to said ring member for releasably connecting said mechanism thereto.

7. In the combination as defined in claim 6 wherein said means for attaching includes a plurality of spaced set screws threadedly attached to said ring member and extending generally radially of said axle hub and releasably engageable with said axle hub.

8. In the combination as defined in claim 6 further comprising another low pressure tire indicating mechanism, said releasable means including a pair of spaced elements spaced outwardly of said ring member, each said low pressure indicating mechanism including a base portion having a passageway therein, said elements extending into respective said passageways for attaching said mechanism to said ring member.

9. In the combination as defined in claim 6 wherein said releasable means includes an element spaced outwardly of said ring member, said low pressure indicating mechanism including a base portion having a passageway therein, said element extending into said passageway for attaching said mechanism to said ring member.

10. In the combination as defined in claim 9 wherein said releasable means includes means for releasably maintaining said element in its operative position within said passageway.

* * * * *